Patented Dec. 4, 1951

2,577,041

UNITED STATES PATENT OFFICE 2,577,041

REACTION PRODUCTS OF (A) COPOLYMERS OF MALEIC ANHYDRIDE AND MONOVINYL COMPOUNDS AND (B) CHLOROPHENOLS OR NITROPHENOLS

Raymond B. Seymour, Chattanooga, Tenn., assignor to the Industrial Research Institute of the University of Chattanooga, Chattanooga, Tenn., a corporation of Tennessee No Drawing. Application April 10, 1948, Serial No. 20,367

9 Claims. (Cl. 260—47)

This invention relates to reaction products of copolymers of vinyl compounds and maleic anhydride and more particularly to such products which have especial utility in minimizing mildew, decay, rot, mold and other damaging effects, particularly in the paper, textile, leather and lumber industries. These reaction products may be referred to generically as fungicides.

Considerable interest has been developed recently in the production of fungicides because of the enormous annual devastating effects of fungi activity. These fungi do considerable damage to textiles, such as clothing, but are even more destructive of articles made of cellulosic materials, which are more likely to remain damp, such as tents, awnings, ropes, nets, beach chairs, tarpaulins, fire hose and boat sails. In addition, leather goods such as luggage, shoes and book bindings are subject to attack by fungi. Effective wood preservation requires that it be protected against rot and surface stain by treatment with a fungicide.

For a fungicide to be entirely suitable, it should possess certain properties in addition to its capacity to poison the fungi. Thus, if the treated article is likely to come into contact with a person, the fungicide must not be toxic or be a skin irritant. If the article is likely to be subjected to a leaching action, as that due to rains, washing and dry-cleaning, the fungicide should resist removal by these conditions. In addition, it may frequently be necessary that the fungicide be colorless, resistant to sunlight, odorless, and be easy to apply. It is also evident that the fungicide should not be destructive to the material to which it is applied.

In accordance with the present invention, fungicides are obtained by reacting certain compounds with the copolymers of maleic anhydride and vinyl compounds. The nature of these copolymers may advantageously be considered, before considering their reaction products contemplated by the invention.

The vinyl compounds which may be copolymerized with maleic anhydride are alkyl or aryl, acrylates or methacrylates, such as methyl acrylate and methyl methacrylates, styrene, vinyl acetate, α-methylstyrene, methyl isopropenyl ketone, vinyl isopropenyl ether, vinyl ethyl hexyl ether, cyclohexyl methacrylate, and isobutyl acrylate. These copolymers may be produced, for example, according to the teaching of Voss et al. Patent 2,047,398.

In accordance with the invention, these copolymers of maleic anhydride and vinyl compounds are reacted in solution form, with phenolic derivatives, particularly halo or nitro derivatives of phenol, cresol or xylenol. The half esters which are obtained from these phenols may be used in this form but as they are more or less water soluble, the invention contemplates their insolubilization by the addition of compounds of heavy metals such as mercury, tin, copper, zinc, nickel and silver. Valuable salts may also be obtained from these reaction products of the copolymer and a phenolic compound, by a further reaction with an amine such as urea, ethylene diamine or p-chloroaniline.

As a modification of the above generally stated procedure, the invention contemplates the formation, first, of an alkali metal salt of the copolymer of maleic anhydride and a vinyl compound, and the reaction thereafter with a heavy metal compound. The corresponding heavy metal salt of the copolymer which is obtained, due to the cation transfer, is useful as a decay or rot preventative.

To obtain the phenolic derivative of the copolymer, the copolymer is first dissolved in a suitable organic solvent such as dioxane or acetone. A satisfactory concentration of this mixture contains from 5 to 20% by weight of the copolymer, a 10% solution being preferred. To this solution should be added a small amount of an alkali which serves as a catalyst, such as sodium carbonate, and this may constitute from 0.1 to 0.5% of the solution, by weight, a 0.25% concentration being usual.

The selected phenolic derivative is then added to this mixture and refluxed for 10 to 25 hours to complete the reaction. Ordinarily, a period of 15 hours will suffice. The phenolic compound should be added in approximately equimolar proportions, relative to the maleic anhydride component of the copolymer. Thus, one molecular equivalent of the selected phenolic compound should be added for each molecular equivalent of the dissolved copolymer (in terms of the maleic anhydride component of the copolymer), but an excess of either will not materially adversely affect the results.

Representative phenolic compounds which may be used are o-chlorophenol, 2,4,5-trichlorophenol, dichlorophenol, pentachlorophenol, 4-chloro-2-phenylphenol, p-chlorophenol, m-chlorophenol, and o-nitrophenol.

After the reaction is completed the solution is poured, with agitation, into a liquid which is a non-solvent for the reaction product, so that it is precipitated. A suitable liquid for this purpose is water. The precipitated product can then be easily recovered.

This product can be used directly as a fungicide by applying it to the surface to be protected. This is most easily accomplished by dissolving it in a volatile solvent which is then applied as by a brush or by dipping the article in the solution. A suitable solvent is acetone or dioxane.

If it is desired that the fungicide be washproof, it should be insolubilized, and this is accomplished, according to the invention, by treating the fungicide with a solution containing a heavy metal ion, after the fungicide is applied to the goods to be protected. To carry this out, the product resulting from the condensation of the copolymer and the phenolic compound is dissolved in a solvent which will enable its application to the article to be protected. A suitable liquid for this purpose is an inorganic solvent, but a dilute aqueous alkaline solution is preferred. For example, a ½-2% aqueous sodium hydroxide solution may be used as solvent and a mixture may be made up from this, containing ½-2% by weight of the reaction product.

This mixture is then applied to the goods as by spraying, brushing, or padding for example, and then a liquid containing a heavy metal ion, as mentioned above, is padded onto the goods. This last solution is preferably a dilute one, in which the heavy metal compound is present from ½-2% by weight. The cation of this solution may, for example, be mercury, tin, copper, zinc, nickel or silver, and the anion may be an organic or inorganic radical, so long as the compound is soluble, such as an acetate, sulphate, chloride, phosphate or hydroxide.

When the solution containing this metallic ion is brought into contact with the condensation product of the copolymer and the phenolic compound, an interaction occurs which results in the insolubilization of the condensation product. The article is then preferably washed and dried and thereafter it will be found that the article is wash-proof or leach-proof.

Instead of the heavy metal ion, the invention contemplates the use of amines such as urea, ethylene diamine, or p-chloroaniline, to insolubilize the condensation product of the copolymer and the phenolic compound. The solution containing this amine is suitably one having a ½-2% concentration by weight, and it may be used in the manner described for the heavy metal ion solution to precipitate the fungicide in situ in the article to be protected.

It should be observed that it is not necessary to the practice of the invention that the insoluble salt be formed in or on the article, as the conversion by the heavy metal ion or amine can take place in the liquid solution. The solution can then be sprayed or otherwise applied or employed as a fungicide. For example, the liquid containing this insoluble fungicide may be sprayed in stacked lumber or be added to the beater in a paper mill to overcome decay and mold. Or, if desired, the insolubilized product can be recovered and be added to paints and leather dressings for example, to impart fungicidal properties to the resulting coatings.

To practice the above mentioned modification of the invention which does not involve the reaction with a phenolic compound, the copolymer is first converted to the salt of an alkali metal and then to the desired heavy metal salt. The preliminary treatment involves first dissolving the copolymer in a solvent such as an aqueous alkali solution and the addition thereto of an alkali metal ion such as that of potassium hydroxide, potassium carbonate, sodium carbonate, sodium hydroxide, ammonium hydroxide. The alkali is dissolved in the solution containing the polymer so that the mixture contains from 5-20% of the alkali by weight.

This solution is allowed to stand until no material change in the pH is observed. After this the alkali metal salt which has been formed, may be converted to a heavy metal salt by the addition of a compound containing the desired heavy metal. This heavy metal may be one of the several which have been referred to above.

The invention contemplates the formation of the desired heavy metal salt in the solution in which it is to be used instead of the formation of this heavy metal salt in the solution in which the alkali metal salt was formed. Thus, after the alkali metal salt is formed, the solution containing it may be added to the beater in a pulp mill, and thereafter, the compound containing the desired heavy metal may be added to the beater.

The invention will be further illustrated by reference to the following examples:

Example 1

To 20.2 parts styrene-maleic anhydride copolymer in 200 parts dioxane was added 12.8 parts o-chlorophenol and 0.5 part sodium carbonate and the solution was refluxed for 15 hours and poured into water with agitation. The product was dissolved in 3330 parts 1% aqueous sodium hydroxide and the solution was applied to cotton cloth in a padder, partly dried and then padded with a 0.5% aqueous solution of mercuric acetate, rinsed and dried. The treated cloth was washed and tested in comparison with untreated cloth and cloth that had been treated with chlorophenol and mercuric acetate in the absence of the copolymer and washed. The results are tabulated below:

|  | Untreated Cloth | Chlorophenol and mercuric acetate Treated Cloth | Cloth Treated as in Ex. 1. |
| --- | --- | --- | --- |
| Buried in soil | no strength | no strength | slight loss in strength. |
| Inoculated with *Asperigillus niger*. | good growth | good growth | no growth. |
| *Memnoniella echinata*. | do | do | Do. |
| *Chaetomium globosum*. | do | do | Do. |

Example 2

To 18.4 parts vinyl acetate-maleic anhydride copolymer in 200 parts dioxane was added 19.7 parts 2,4,5-trichlorophenol and 0.5 part sodium carbonate and the solution was refluxed for 15 hours and poured into water with agitation. The precipitate was dissolved in 3810 parts 1% aqueous sodium hydroxide. 4 parts urea was added to this solution and it was then sprayed in stacked lumber. After the lumber had stood for 3 months there was no evidence of blue sap stain while lumber that had not been treated was affected badly.

Example 3

To 20 parts of an equimolar copolymer of methyl methacrylate and maleic anhydride in 200 parts dioxane was added 16.3 parts dichlorophenol and 0.5 part sodium carbonate and the solution was refluxed for 15 hours and poured into water with agitation. The precipitate was dissolved in 3630 parts 1% aqueous sodium carbonate. This solution was added to the beater in a paper mill and this was followed by the addition of 10 parts zinc acetate in 1000 parts water to the beater. Prior to this addition, hard slime spots appeared in the paper. None was noticeable after the addition of the copolymer ester salt.

Example 4

To 25.4 parts of the copolymer of vinyl ethyl hexyl ether and maleic anhydride in 250 parts dioxane was added 26.6 parts pentachlorophenol and 0.5 part sodium carbonate. The solution was refluxed for 8 hours and then poured into water with agitation. 5 parts of the precipitate was dissolved in 1000 parts isopropyl alcohol and the solution was brushed on the back of books stored in a damp atmosphere. There was no apparent mold growth on the books thus treated, although the untreated books were badly damaged under these conditions.

Example 5

5 parts of the precipitate from Example 4 was dissolved in 200 parts 1% aqueous sodium hydroxide and cotton cloth was impregnated with this solution and dried. The dried treated cloth was then impregnated with a 0.5% aqueous solution of silver acetate and dried. The treated cloth was resistant to flame and mildew.

Example 6

Example 5 was repeated using a 0.5% aqueous solution of ethylene diamine in place of silver acetate. Similar results were obtained.

Example 7

To 20.2 parts styrene-maleic anhydride copolymer in 200 parts dioxane was added 20.5 parts 4-chloro-2-phenylphenol and 0.5 part sodium carbonate and the solution was refluxed for 18 hours and poured into water with agitation. The precipitate was dissolved in 4000 parts 1% aqueous sodium hydroxide and sprayed on woolen suiting, followed by a spray of a 1% aqueous solution of the acetates of high molecular weight amines consisting essentially of a mixture of stearyl and oleyl amines known to the trade as "Armeen." After drying, the treated garment was resistant to water even after drycleaning.

Example 8

Example 1 was repeated using p-chlorophenol and adding a 0.5% aqueous solution of stannous chloride neutralized with aqueous ammonia. Substantially the same results were obtained.

Example 9

Example 1 was repeated using m-chlorophenol and adding a 0.5% aqueous solution of cupric acetate. Substantially the same results were obtained.

Example 10

To 18.4 parts of copolymer of maleic anhydride and vinyl isopropyl ether in 200 parts dioxane was added 13.9 parts o-nitrophenol and 0.5 part sodium carbonate and the solution was refluxed for 15 hours and poured into water with agitation. The dried product was dissolved in 600 parts isopropopanol to which was added 12.7 parts p-chloroaniline and the resulting product was used as a fungistatic agent.

Example 11

20.2 parts styrene-maleic anhydride as the sodium salt in 200 parts water was added to a beater in a pulp mill followed by 32 parts mercuric acetate in 200 parts of water. Slime spots disappeared as in Example 3.

Example 12

Example 11 was repeated using 18 parts zinc acetate in 200 parts water. The slime spots disappeared.

Example 13

A tanning solution was made by dissolving 6.6 parts of the half ester from Example 1 in 100 parts water containing sufficient sodium hydroxide to raise the pH to 5.0. The calfskin hides were drained for three hours and dilute hydrochloric acid was added intermittently over a period of 90 minutes. The calfskin was removed, washed and dried and a white leather of excellent quality that was resistant to mold growth was obtained.

What is claimed is:

1. The process of forming a reaction product of a copolymer of maleic anhydride and a compound having a single vinyl group to obtain a fungicide, which comprises mixing into a solution containing the dissolved copolymer substantially equimolar proportions, relative to the maleic anhydride component of the copolymer, of a monohydric phenolic compound selected from the class consisting of chlorophenols and mono-nitrophenols having besides the phenolic hydroxyl group no reactive group other than chlorine and nitro, respectively, and heating the mixture at an elevated temperature to effect reaction between said copolymer and said phenolic compound.

2. The process of forming a reaction product of a copolymer of maleic anhydride and a compound having a single vinyl group to obtain a fungicide, which comprises mixing into a solution containing the dissolved copolymer and a small amount of an alkaline catalyst substantially equimolar proportions, relative to the maleic anhydride component of the copolymer, of a monohydric phenolic compound selected from the class consisting of chlorophenols and mono-nitrophenols having besides the phenolic hydroxyl group no reactive group other than chlorine and nitro, respectively, and heating the mixture at an elevated temperature to effect reaction between said copolymer and said phenolic compound.

3. The process of forming a reaction product of a copolymer of maleic anhydride and a compound having a single vinyl group to obtain a fungicide, which comprises mixing into a solution containing the dissolved copolymer substantially equimolar proportions, relative to the maleic anhydride component of the copolymer, of a monohydric phenolic compound selected from the class consisting of chlorophenols and mono-nitrophenols having besides the phenolic hydroxyl group no reactive group other than chlorine and nitro, respectively, heating the mixture at an elevated temperature to effect reaction between said copolymer and said phenolic compound, and thereafter reacting a solution of the resulting condensation product with a solution of a heavy metal compound to form a heavy metal salt of said condensation product.

4. The process of forming a reaction product of a copolymer of maleic anhydride and styrene to obtain a fungicide, which comprises mixing into a solution containing the dissolved copolymer substantially equimolar proportions, relative to the maleic anhydride component of the copolymer, of a monohydric phenolic compound selected from the class consisting of chlorophenols and mono-nitrophenols having besides the phenolic hydroxyl group no reactive group other than chlorine and nitro, respectively, heating the mixture at an elevated temperature to effect reaction between said copolymer and said phenolic compound, and thereafter reacting the resulting condensation product with a solution of a heavy metal compound to form a heavy metal salt of said condensation product.

5. The process of forming a reaction product of a copolymer of maleic anhydride and vinyl acetate to obtain a fungicide, which comprises mixing into a solution containing the dissolved copolymer in substantially equimolar proportions, relative to the maleic anhydride component of the copolymer, of a monohydric phenolic compound selected from the class consisting of chlorophenols and mono-nitrophenols having besides the phenolic hydroxyl group no reactive group other than chlorine and nitro, respectively, heating the mixture at an elevated temperature to effect reaction between said copolymer and said phenolic compound, and thereafter reacting the resulting condensation product with a solution of a heavy metal compound to form a heavy metal salt of said condensation product.

6. A process comprising heat-reacting (a) a copolymer of maleic anhydride and a compound having a single vinyl group with (b) a monohydric phenolic compound selected from the class consisting of chlorophenols and mon-nitrophenols having besides the phenolic hydroxyl group no reactive group other than chlorine and nitro, respectively, said monohydric phenolic compound (b) being employed in substantially equimolar proportions relative to the maleic anhydride component of said copolymer (a).

7. A process as in claim 6 wherein (a) and (b) are reacted in the presence of an alkaline catalyst.

8. A process comprising heat-reacting (a) a copolymer of maleic anhydride and a compound having a single vinyl group with (b) a monohydric phenolic compound selected from the class consisting of chlorophenols and mono-nitrophenols having besides the phenolic hydroxyl group no reactive group other than chlorine and nitro, respectively, said monohydric phenolic compound (b) being employed in substantially equimolar proportions relative to the maleic anhydride component of said copolymer (a), and thereafter reacting the resulting copolymer derivative with a solution of a heavy metal compound to form a heavy metal salt of said copolymer derivative.

9. A process comprising heat-reacting (a) a copolymer of maleic anhydride and styrene with (b) a monohydric chlorophenol having besides the phenolic hydroxyl group no reactive group other than chlorine, said monohydric chlorophenol (b) being employed in substantially equimolar proportions relative to the maleic anhydride component of said copolymer (a), and thereafter reacting the resulting copolymer derivative with a solution of a heavy metal compound to form a heavy metal salt of said copolymer derivative.

RAYMOND B. SEYMOUR.

REFERENCES CITED

The following references are of record in the file of this patent:

UNITED STATES PATENTS

| Number | Name | Date |
|---|---|---|
| 2,047,398 | Voss et al. | July 14, 1936 |
| 2,220,867 | Kirk | Nov. 5, 1940 |
| 2,313,728 | Austin | Mar. 16, 1943 |
| 2,320,422 | Frolich | June 1, 1943 |
| 2,356,879 | Pense | Aug. 29, 1944 |
| 2,399,084 | Watson | Apr. 23, 1946 |
| 2,454,284 | Kirk | Nov. 23, 1948 |
| 2,497,927 | Bruson | Feb. 21, 1950 |

FOREIGN PATENTS

| Number | Country | Date |
|---|---|---|
| 420,589 | Great Britain | Dec. 3, 1934 |

OTHER REFERENCES

Beilsteins Handbuch der Organischen Chemie, vol. 6, page 156.